United States Patent [19]
Kato

[11] Patent Number: 4,999,727
[45] Date of Patent: Mar. 12, 1991

[54] DISC CARTRIDGE WITH ALIGNMENT ELEMENTS ON TWO HUB HALVES

[75] Inventor: Yoshitake Kato, Yuki, Japan

[73] Assignee: Hitachi Maxell Ltd., Osaka, Japan

[21] Appl. No.: 251,530

[22] Filed: Sep. 30, 1988

Related U.S. Application Data

[63] Continuation of Ser. No. 643,320, Aug. 22, 1984, abandoned.

[30] Foreign Application Priority Data

Aug. 24, 1983 [JP] Japan ................... 58-155232

[51] Int. Cl.$^5$ ............................................. G11B 23/03
[52] U.S. Cl. ................................................ 360/133
[58] Field of Search ................. 360/133, 132, 135, 86, 360/97.1, 99.1; 206/444; 346/137; 369/261, 270; 523/458, 515; 524/413

[56] References Cited

U.S. PATENT DOCUMENTS

| H79 | 7/1986 | Bartholet et al. | 360/133 |
| 4,009,043 | 2/1977 | Pries | 524/413 |
| 4,011,193 | 3/1977 | Wambach | 524/413 |
| 4,442,254 | 4/1984 | Aratani | 524/413 |
| 4,525,758 | 6/1985 | Nakagawa et al. | 360/133 |

FOREIGN PATENT DOCUMENTS 0085983 8/1983 European Pat. Off. .............. 360/97

Primary Examiner—David J. Severin
Attorney, Agent, or Firm—Birch, Stewart, Kolasch & Birch

[57] ABSTRACT

A disc cartridge including a disc sheet and a hub assembly formed by an upper half member and a lower half member, one of which has a positioning projection, and the disc sheet is provided with a hole engageable with the positioning projection so that the disc sheet can be placed in a correct position by fitting the hole of the disc sheet with the positioning projection.

8 Claims, 4 Drawing Sheets

FIG. 3
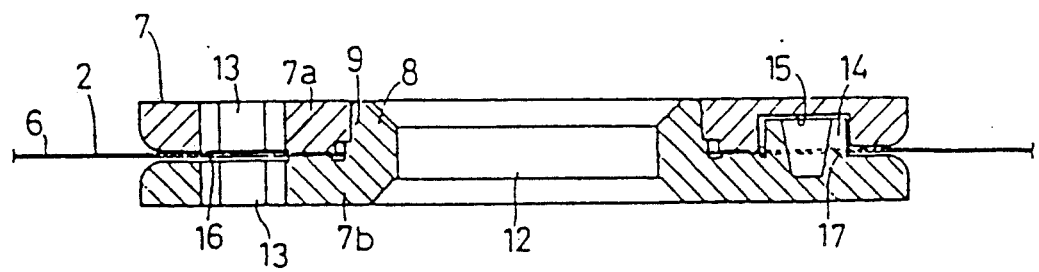
FIG. 4
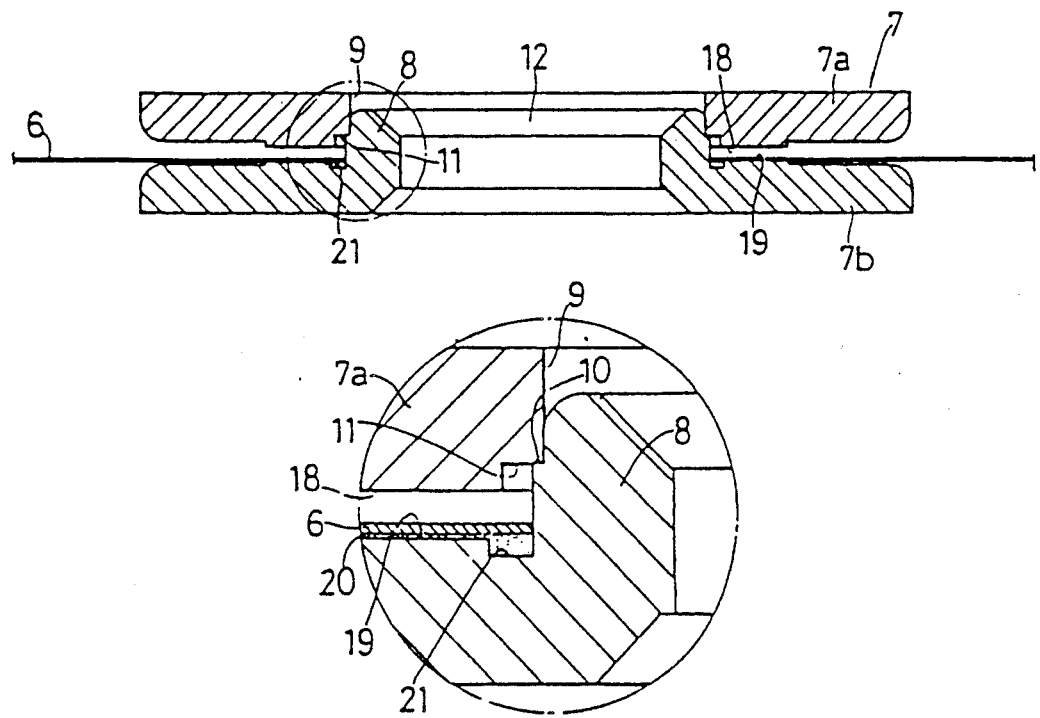
FIG. 4a

DISC CARTRIDGE WITH ALIGNMENT ELEMENTS ON TWO HUB HALVES

This application is a continuation of copending application Ser. No. 643,320, filed on Aug. 22, 1984, now abandoned.

BACKGROUND OF THE INVENTION

1. Field of the Invention

The present invention relates to a disc cartridge, and more particularly to a hub assembly for use in a recording disc cartridge comprising a recording disc rotatably mounted in a cartridge case by the hub assembly attached to the central portion of the recording disc.

2. Prior Art

FIG. 1 shows a recording disc cartridge of the above type, wherein a disc case 1 is formed in a generally hard and flat rectangular shape and a floppy recording disc sheet 6 is enclosed in the disc case 1 rotatably supported by a hub assembly 7, which is formed by a combination of an upper half member 7a and a lower half member 7b (FIG. 7). The disc sheet 6 is securely assembled to the hub assembly 7 by clamping both surfaces of a peripheral edge portion of a central hole 5 of the disc sheet 6 by the respective faces of the upper half member 7a and the lower half member 7b. The faces of the both halves 7a and 7b clamping the disc sheet 6 are referred to as butting faces hereinafter. Each of the upper half member 7a and the lower half member 7b is provided with a spindle receiving hole 12 in the form of a through hole defined at its center and a drive pin receiving hole 13 in the form of a through hole defined in a position eccentric to the center of the hub assembly 7, while the disc sheet 6 is provided with a through hole 16 so as to communicate with the drive pin receiving hole 13 of the hub assembly 7, so that when the disc cartridge is mounted on a disc drive apparatus (not shown), a central spindle and a drive pin both provided in the disc drive apparatus are inserted in the spindle receiving hole 12 and the drive pin receiving hole 13 respectively for rotation of the recording disc 2.

In assembling the disc sheet 6 and the hub assembly 7, the disc sheet 6 is put on the butting face of the lower half member 7b having a boss 8 (FIG. 3) in such a manner that the central hole 5 of the disc sheet 6 is aligned with the spindle receiving hole 12 and the through hole 16 is aligned with the drive pin receiving hole 13 of the lower half member 7b, and in turn the upper half member 7a is placed on the lower half member 7b with the peripheral portion of the central hole 5 of the disc sheet 6 interposed between the respective butting faces of the the upper half member 7a and the lower half member 7b, then both halves 7a and 7b are connected integrally.

However, in the process of assembling of the disc sheet and the both halves, it is difficult to align the through hole 16 with the drive pin receiving hole 13 by merely putting the disc sheet on the hub assembly.

SUMMARY OF THE INVENTION

An essential object of the present invention is to provide a disc cartridge wherein the disc sheet can be easily aligned in position so that the work of assembling the disc cartridge can be simplified.

Another object of the present invention is to provide a disc cartridge in which the disc sheet can easily be assembled to the hub assembly for either surface of the disc sheet.

According to the present invention, there is provided a disc cartridge comprising a hub assembly formed by a pair of hub halves (7a and 7b) assembled together holding a disc sheet (6) therebetween in such a manner that a peripheral portion of a central hole (5) defined on the center portion of the disc sheet (6) is clamped by butting faces of the hub halves (7a and 7b), wherein each of the hub halves is provided with a central hole (12), a drive pin receiving hole (13) defined at a position eccentric to the center of the central hole (12) and a positioning projection (14) situated at a corresponding position of the drive pin receiving hole (13) symmetrical with respect to the center of the central hole (12) and the disc sheet (6) is provided with holes 17 and 16 corresponding to the positioning projection (14) and the drive pin receiving hole (13) respectively.

BRIEF EXPLANATION OF THE DRAWINGS

FIG. 3 is a cross sectional view taken along the lines III—III in FIG. 2, FIG. 4 is a cross sectional view with an enlarged section showing a process of assembling the upper half member and the lower half member of the hub assembly.

DETAILED DESCRIPTION OF THE PREFERRED EMBODIMENTS

Figure 1:
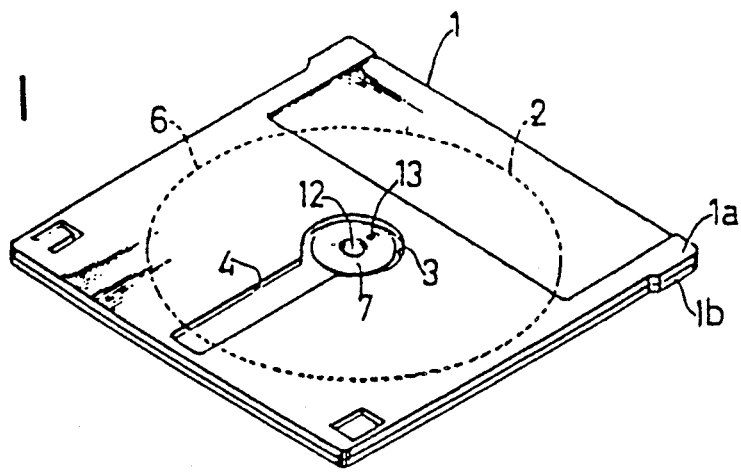
FIG. 1 is a perspective view of an example of a recording disc cartridge.
Figure 2:
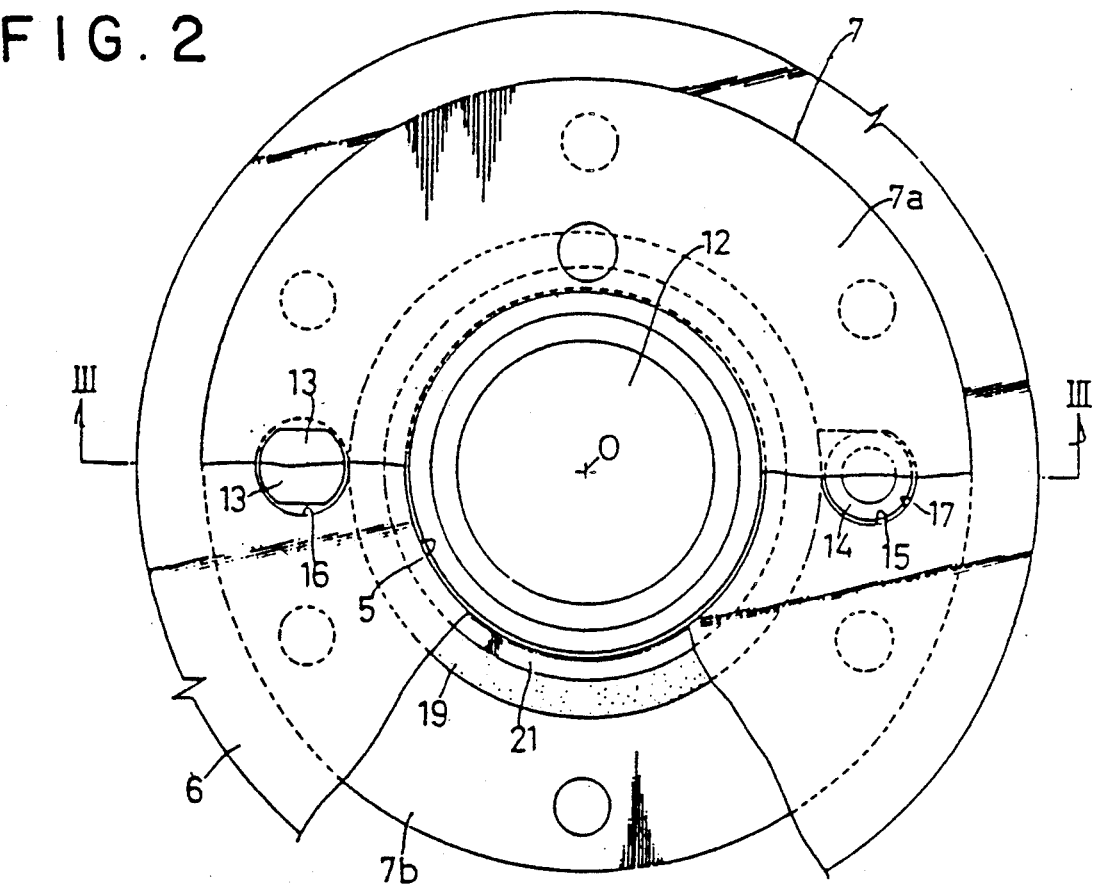
FIG. 2 is a plane view showing an example of a hub assembly used in the recording disc cartridge shown in FIG. 1.

Referring to FIGS. 2 to 4, the hub assembly 7 is formed by the upper half member 7a and lower half member 7b, each made of plastic resin materials. The floppy disc sheet 6 is assembled with the hub assembly 7 by clamping the peripheral edge portion of the central hole 5 of the disc sheet 6 between the upper half member 7a and the lower half member 7b.

Each of the halves 7a and 7b is made of a plastic resin material having good moldability, such as poly acetal or poly buyleneterephalate to which preferably inorganic filaments are added for reinforcement. As the inorganic filaments, glass fibers or potassium titanate whiskers are used. In particular the latter is preferred. A hub formed of plastic resin material comprising glass fibers has a possibility of abrading the drive members of a disc drive apparatus. To the contrary the potassium titanate whiskers ($K_2O \cdot nTiO_2$) have an average length of from 1 to 10 micron meters, the radius of the fiber is 0.2 to 0.5 micron meters, a moh's hardness of 4.0, tensile strength 500 to 700 kgf/mm$^2$, tensile elasticity of about 28,000 kgf/mm$^2$, and a volume resistivity factor of $3.3 \times 10^{15}$ ohm, and are needle like crystals having 1/20 the radius and 1/100 the length of those of the glass fibers. Thus, the hub made of plastic resin materials in which the potassium titanate whiskers are mixed shows a high abrasion resistance with only a slight possibility of abrading the drive members of a disc drive apparatus, and furthermore the thermal expansion factor is low so that the amount of deformation of the disc sheet can also be decreased. The amount of the potassium tiatnate whiskers included in the plastic resin is about 10% to 30%, preferably about 15% to 20%.

One of the halves 7a and 7b is provided with a projected boss 8 on its central portion and the other is provided with a hole 9 complementary to the boss 8 so that the both halves can be connected together by mating the boss 8 with the hole 9. In the embodiment shown, the lower half member 7b is provided with the boss 8 and the upper half member 7a is provided with the hole 9.

Both halves 7a and 7b are connected together by mating the boss and the hole, as described above, and integrally secured by a supersonic welding method. More specifically, as shown in FIG. 4, there is formed an enlarged annular wall 10 around the foot portion of the boss 8 with the diameter thereof larger than the diameter of the upper portion of the boss 8. On the other hand, the hole 9 has a diameter smaller than the diameter of the annular wall 10 so as to define an annular slot 11 around the peripheral portion of the lower or deep part of the hole 9 for receiving a possible amount of plastic resin material molten during the process of welding of the boss 9. Then the halves 7a and 7b are assembled, the lower half 7b receiving the upper half member 7a by the annular wall 10 preliminarily, and in turn the upper half member 7a is pushed downward melting the annular wall 10 by the supersonic welding machine, thereby resulting in welding the outer surface of the boss 8 to the inner surface of the hole 9.

Since each of the drive pin receiving holes 13 of both halves 7a and 7b is defined at a position eccentric with respect to the center of the hub assembly 7, it is necessary to assemble both halves 7a and 7b under such a condition that the drive pin insertion holes 13 of both halves 7a and 7b are coaxially placed. Specifically, as the radial displacement and the axial displacement between the upper half member 7a and the lower half member 7b are prevented by a tight engagement between the boss 8 and the hole 9, it is necessary to define the relative position of both halves 7a and 7b with respect to the circumferential direction of the hub assembly. For this purpose, according to the present invention, there are provided positioning elements in the form of a mating arrangement on the butting faces of both halves 7a and 7b. Specifically, a positioning projection 14 is provided on the butting face of the lower half member 7b and a positioning recess 15 complementary to the positioning projection 14 is defined on the butting face of the upper half member 7a. It is noted that the positions of both of the positioning projection 14 and the positioning recess 15 and the position of the drive pin receiving hole 13 are symmetrical with respect to the center 0 of the central hole 12. In this arrangement, by mating the boss 8 in the hole 9 with the positioning projection 14 mated in the positioning recess 15, both halves 7a and 7b can be assembled together with both drive pin receiving holes 13 on both halves 7a and 7b aligned correctly. It is desired to form the positioning projection 14 as a hollow cylindrical configuration so as to prevent occurrence of sink marks in the process of molding of the disc case.

Figure 5:
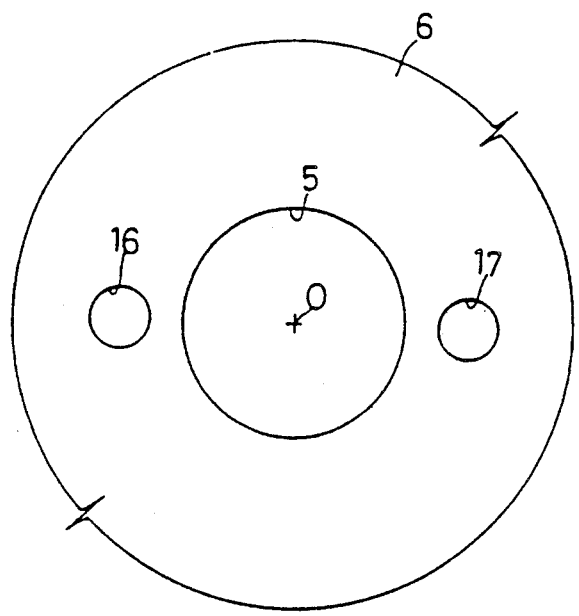
FIG. 5 is a top plan view showing an example of the disc sheet.

The disc sheet 6 (FIG. 5) is provided with two through holes 16 and 17 on opposite or corresponding positions symmetrical with respect to the center of the disc sheet 6. These through holes 16 and 17 have diameters generally equal to the diameter of the drive pin receiving holes 13 and the diameter of the positioning projection 14 respectively and are so positioned that when the disc sheet 6 is clamped in position between the upper half member 7a and the lower half member 7b. the drive pin receiving holes 13 align with the through hole 16 and the positioning projection 14 penetrates the through hole 17. Thus, upon placing the disc sheet 6 on the lower half member 7b, having the boss 8 of the lower half member 7b fitted in the central hole 5 of the disc sheet 6 and the through hole 17 fitted with the positioning boss 14, the through hole 16 can be automatically aligned with the drive pin receiving hole 13. Subsequently the upper half member 7a is placed on the lower half member 7b, fitting the central hole 9 with the boss 8, and the positioning projection 14 is fitted in the positioning recess 15 respectively, clamping the disc sheet 6, and in turn both halves 7a and 7b are connected together by supersonic welding. Since the through holes 16 and 17 are defined in a symmetrical postion with respect to the center of the central hole, the disc sheet can be assembled on the correct position of the hub assembly independent of whether the disc sheet is turned over.

The thickness of each of the halves 7a and 7b is different from position to position, therefore, it is difficult to provide a strictly uniform flat surface on the butting faces of the halves 7a and 7b in the molding process. In order to eliminate this difficulty, there are formed annular ribs 18 and 19 surrounding the central holes 12 on the inner part of the butting face portions of both halves 7a and 7b with the top surfaces of the annular ribs 18 and 19 made flat, so that the inner peripheral edge portion of the disc sheet 6 can be clamped only by the annular ribs 18 and 19 but with the over all flat surfaces of the ribs 18 and 19 contacting the disc sheet 6 defining possible gaps g between both surfaces of the disc sheet 6 and the outer parts of the butting faces of both halves 7a and 7b, when both halves 7a and 7b are assembled together with the disc sheet interposed therebetween. According to the arrangement as described above, different from such an arrangement that the whole butting surfaces of the upper and lower halves 7a and 7b are adapted to abut onto the disc sheet 6, the diameter of the annular parts clamping the disc sheet is relatively small, accordingly, the difference of the dimensional changes of the disc sheet 6 and the hub assembly 7 will be rather small even if there is a difference of the thermal expansion factors of the disc sheet 6 and the hub assembly 7, whereby undesired deformation of the disc sheet due to the temperature change can be effectively decreased. Also, even if there occurs a deformation of the disc sheet 6, such deformation can be absorbed in the gaps g so that the main part of the disc sheet used for recording is not badly affected by the deformation.

Figure 6:
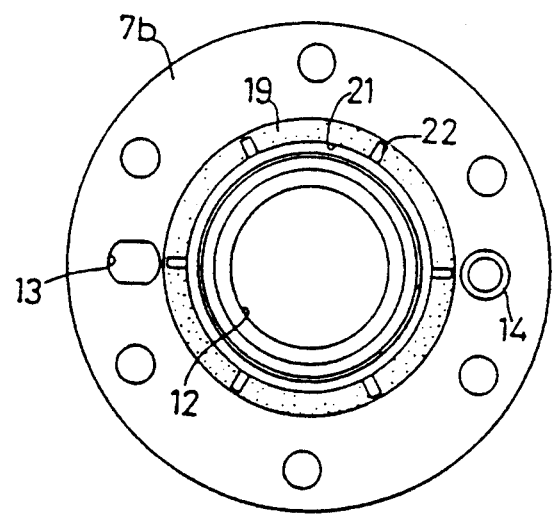
FIG. 6 is a top plan view of another example of the disc cartridge according to the present invention.

As shown in FIG. 4, the peripheral edge portion of the central hole 5 of the disc sheet 6 is securely fitted to the flat face 19 of the lower half member 7b by an adhering material 20. An annular slot 21 is defined surounding the root portion of the boss 8 so that the adhering material can be coated around the root portion uniformly. In addition to the annular slot 21, there may be defined a plurality of radial slots 22, as shown in FIG. 6, so that the adhering member can spread uniformly over all the butting surfaces of the annular ribs 18 and 19 for facilitating adhering of the disc sheet to the annular ribs. The flat surfaces of the annular ribs 18 and 19 may be formed in a rough surface for increasing adhering force.

Figure 7:
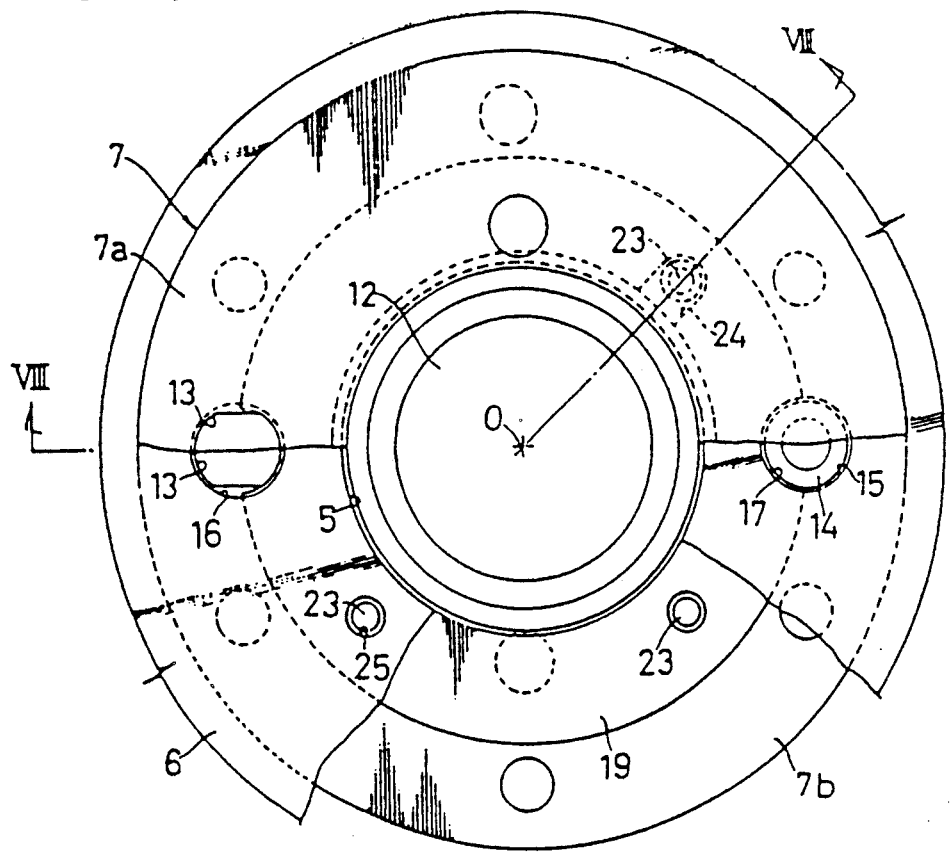
FIG. 7 is a cross sectional view of a further example of the hub assembly according to the present invention.
Figure 8:
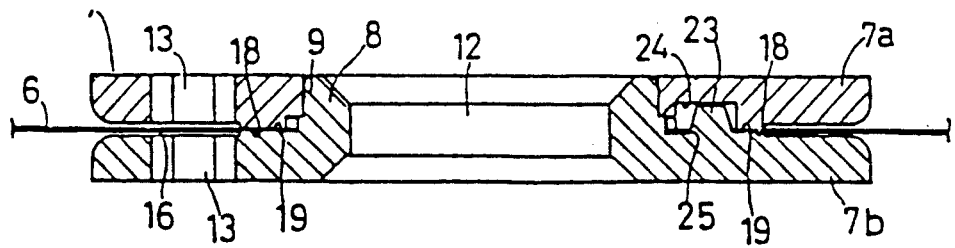
FIG. 8 is a cross sectional view taken along the lines VII—VII in FIG. 7.

In place of adhering the disc sheet 6 to the annular ribs of the lower half member 7b, there may be formed more than two tapered projections 23 on the annular rib of one of the half members 7a or 7b and corresponding recesses 24 for receiving the end portion of the tapered projections 23 on the rib of the other half member (FIGS. 7 and 8). Also a plurality of holes 25 are defined on the disc sheet 6 surrounding the central hole 5. In this construction, upon assembling both halves 7a and 7b, the disc sheet 6 can be clamped between both halves 7a and 7b, causing the tapered projections 23 to press the peripheral edge portions of the holes 25 into the recesses 24. According to this arrangement, the disc sheet 6 can be strongly secured to the hub assembly 7 without using the adhering material.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A disc cartridge comprising a hub assembly formed by a pair of hub halves assembled together holding a disc sheet therebetween in such a manner that a peripheral portion of a central hole defined in a center portion of said disc sheet is clamped by butting faces of said hub halves, each of said hub halves being provided with a central hole corresponding to said central hole of said disc sheet, and corresponding drive pin receiving holes of oblong shape defined at a position eccentric to said central hole and one of said hub halves is provided further with a positioning projection on a butting face thereof, while the other of said hub halves is provided with a positioning recess complementary to said positioning projection, said drive pin receiving holes and said positioning projection and recess being located symmetrical with respect to the central of said central hole of said disc sheet, said disc sheet having recording areas on both surfaces thereof being provided with circular through holes corresponding respectively to said positioning projection and said drive pin receiving holes also located symmetrical with respect to the center of said central hole of said disc sheet, said through holes having diameters generally equal to diameters of said drive pin receiving holes and said positioning projection such that upon assembly said drive pin receiving holes and said positioning projection align with and penetrate into said circular through holes of said disc sheet, respectively.

2. The disc cartridge according to claim 1, wherein said positioning projection is formed as a hollow cylindrical boss.

3. The disc cartridge according to claim 1, wherein one of said hub halves is further provided with at least three tapered projections on its butting face and the butting face of the other hub half is provided with corresponding recesses for mating with said tapered projections and said disc sheet is provided with additional circular through holes corresponding to said tapered projections so that when said disc sheet is clamped between said hub halves, said tapered projections are introduced into said recesses through said through holes of said disc sheet corresponding to said tapered projections with peripheral edge portions of said through holes of said disc sheet being pushed into said recesses by said tapered projections.

4. The disc cartridge according to claim 1, wherein said hub halves are formed of a plastic resin material.

5. The disc cartridge according to claim 4, wherein said plastic resin material includes filaments of inorganic materials.

6. The disc cartridge according to claim 5, wherein said filaments are formed of potassium titanate.

7. The disc cartridge according to claim 6, wherein said potassium titanate is included in the resin material in an amount of from 10% to 30%.

8. The disc cartridge according to claim 6, wherein said filaments are provided in the form of whiskers of potassium titanate having a length of from 10 to 20 micron meters and a diameter of from 0.2 to 0.5 micron meters.

* * * * *